(12) United States Patent
Maeda (10) Patent No.: US 6,919,944 B2
(45) Date of Patent: Jul. 19, 2005

(54) LIQUID CRYSTAL DISPLAY DEVICE AND ELECTRONIC APPARATUS

(75) Inventor: Tsuyoshi Maeda, Yamanashi-ken (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/308,885

(22) Filed: Dec. 3, 2002

(65) Prior Publication Data

US 2003/0133062 A1 Jul. 17, 2003

(30) Foreign Application Priority Data

Dec. 5, 2001 (JP) ........................................ 2001-371806

(51) Int. Cl.[7] ............................................ G02F 1/1335
(52) U.S. Cl. ........................... 349/113; 349/64; 349/106
(58) Field of Search .......................... 349/64, 106, 112, 349/113, 114, 143; 359/599

(56) References Cited

U.S. PATENT DOCUMENTS

| 6,281,952 | B1 | 8/2001 | Okamoto et al. | |
| 6,476,889 | B2 * | 11/2002 | Urabe et al. | 349/106 |
| 2002/0036730 | A1 * | 3/2002 | Baek et al. | 349/106 |
| 2003/0117551 | A1 * | 6/2003 | Fujimori et al. | 349/113 |

FOREIGN PATENT DOCUMENTS

| CN | 1311863 | 9/2001 |
| JP | 11-101992 | 4/1999 |
| JP | 11-242226 | 9/1999 |
| JP | 11-316382 | 11/1999 |
| JP | 2000-180881 | 6/2000 |
| JP | 2000-187210 | 7/2000 |
| JP | 2000-275660 | 10/2000 |
| JP | 2000-298271 | 10/2000 |
| JP | 2000-305099 | 11/2000 |
| JP | 2000-305110 | 11/2000 |
| JP | 2000-347182 | 12/2000 |
| JP | 2001-221995 | 8/2001 |
| JP | 2001-272674 | 10/2001 |
| JP | 2002-207227 | 7/2002 |
| JP | 2003-295178 | 10/2003 |

* cited by examiner

Primary Examiner—Toan Ton
Assistant Examiner—Tai Duong
(74) Attorney, Agent, or Firm—Harness, Dickey & Pierce, P.L.C.

(57) ABSTRACT

A liquid crystal display device 10 includes a pair of substrates 1 and 2 and a liquid crystal layer 3 held between the pair of substrates 1 and 2. The liquid crystal layer 3 includes at least two regions for displaying images, having different thicknesses from each other. One of the regions is a reflective display region R and the other is a transmissive display region T. The reflective display region R is provided with a reflection layer 16 capable of reflecting light and a transmissive scattering layer 22b capable of scattering light. The thickness of the liquid crystal layer 3 in the reflective display region R is set smaller than the thickness of the liquid crystal layer 3 in the transmissive display region T.

8 Claims, 11 Drawing Sheets

LIQUID CRYSTAL DISPLAY DEVICE AND ELECTRONIC APPARATUS

DETAILED DESCRIPTION OF THE INVENTION

1. Technical Field of the Invention

The present invention relates to liquid crystal display devices and electronic apparatuses, and particularly to a technique of displaying bright and high-contrast images using a transflective liquid crystal display device having both reflective and transmissive display systems.

2. Description of the Related Art

Reflective liquid crystal display devices reduce power consumption because they do not have any light sources, such as a backlight. Therefore they have been used for various devices, such as portable electronic apparatuses. However, since reflective liquid crystal display devices use outside light, such as natural light and illumination light, to display images, it is difficult to view the images in dark places. Accordingly, a transflective liquid crystal display device has been proposed which uses external light in bright places, as in the conventional reflective liquid crystal display devices, and uses an internal light source to make displayed images visible in dark places. This transflective liquid crystal display device uses a display system serving as both a reflective display and a transmissive display. In this system, a reflective display mode or a transmissive display mode is selected according to the ambient brightness, thereby displaying clear images even in dark places while reducing power consumption.

As such a transflective liquid crystal display device, a liquid crystal display device has been proposed which has a liquid crystal layer between transmissive upper and lower substrates and a reflective layer having slits for transmitting light on a metallic layer such as aluminum or the like on the internal side surface of the lower substrate so as to act as a transflective film. In a reflective mode, external light emitted through the upper substrate passes through the liquid crystal layer, subsequently reflects at the reflective layer disposed on the internal side surface of the lower substrate, and is thus emitted from the upper substrate side toward the outside through the liquid crystal layer again. On the other hand, in a transmissive mode, light emitted from a backlight through the lower substrate passes through the slits on the reflective layer and the liquid crystal layer, and is thus emitted toward the outside through the upper substrate. Hence, the regions having the slits are transmissive display regions, and the regions not having the slits are reflective display regions.

In this transflective liquid crystal display device, the retardation $\Delta nd$ in a liquid crystal, which is expressed as the product of the thickness d of the liquid crystal layer and the refractive index anisotropy $\Delta n$ of the liquid crystal, is $2 \times \Delta nd$ in the reflective display regions because incident light passes through the liquid crystal layer twice. On the other hand, the retardation $\Delta nd$ in the liquid crystal in the transmissive display region is $1 \times \Delta nd$ because light from the backlight passes through the liquid crystal layer only once.

While the transflective liquid crystal display device has different retardations between the reflective display regions and the transmissive display regions, the orientation of liquid crystal molecules of the liquid crystal layer is aligned by applying an electric field to the liquid crystal at the same driving voltage in both display modes. In other words, the liquid crystal having different retardations between the transmissive display region and the reflective display region is oriented at the same driving voltage. This makes it difficult to obtain high-contrast images and bright images.

Accordingly, a technique has been proposed in which, in order to make the retardation uniform, an acrylic resin is disposed above the lower substrate only in the reflective display region so that the thickness of the liquid crystal layer in the reflective display region is smaller than that in the transmissive display region. In this instance, in order to increase the brightness of images displayed in a reflective display mode, asperities are formed on the surface of the acrylic resin, and a reflection electrode is formed on the asperities so that incident light is scattered and reflected. However, the formation of these asperities requires, for example, several applications of photolithography and, therefore, much expense in time.

Accordingly, an object of the present invention is to provide a transflective liquid crystal display device having a structure capable of being easily realized in which bright and high-contrast images can be displayed by efficiently using transmitted light in a transmissive mode, and by efficiently using external light in a reflective mode, and to provide an electronic apparatus including the liquid crystal display device.

SUMMARY OF THE INVENTION

To this end, a liquid crystal display device of the present invention comprises a pair of substrates and a liquid crystal layer held between the pair of substrates. The liquid crystal layer includes at least two regions having different thicknesses from each other. One of the regions includes a reflective display region and the other includes a transmissive display region. The reflective display region is provided with a reflection layer capable of reflecting light and a transmissive scattering layer capable of scattering light. The thickness of the liquid crystal layer in the reflective display region is set smaller than the thickness of the liquid crystal layer in the transmissive display region.

By disposing the transmissive scattering layer in the reflective display region between the pair of substrates, the transmissive scattering layer can serve as an incident light-scattering means for scattering incident light as well as a liquid crystal layer thickness-reducing means for reducing the thickness of the liquid crystal layer in the reflective display region to less than that in the transmissive display region (by means of the thickness of the transmissive scattering layer). Thus, the formation of the transmissive scattering layer in the reflective display region allows the retardation in the reflective display region and the transmissive display region to be uniform, and consequently, bright and high-contrast images can be displayed in both transmissive and reflective display modes. Furthermore, the reflective scattering layer can scatter incident light in the reflective display region, even though asperities are not formed on the surface of the reflection layer. Thus, bright images can be readily displayed in the reflective display mode. One substrate transmitting external light out of the pair of substrates may be an upper substrate, and the other, which transmits light from a backlight used in transmissive display mode, may be a lower substrate.

The reflective display region may include the reflection layer, the transmissive scattering layer, a lower electrode, the liquid crystal layer, and an upper electrode in that order from the lower substrate side. The lower electrode and the upper electrode may be formed of transparent ITO (Indium Tin Oxide). In this structure, external light emitted through the upper substrate (substrate at the display side or external substrate) reaches the reflection layer through the upper electrode, the liquid crystal layer, the lower electrode, and the transmissive scattering layer. After being reflected at the reflection layer, the light is emitted to the outside through the same course. Hence, the light is scattered at least twice and then used for displaying images. Thus, brighter, higher-contrast images can be displayed in the reflective display mode.

Alternatively, the reflective display region may include the reflection layer, a lower electrode, the liquid crystal layer, an upper electrode, and the transmissive scattering layer, in that order from the lower substrate side. In this structure, external light emitted through the upper substrate reaches the reflection layer through the transmissive scattering layer, the upper electrode, the liquid crystal layer, and the lower electrode. After being reflected at the reflection layer, the light is emitted to the outside through the same course. Hence, the light is scattered at least twice and then used for displaying images. Thus, brighter, higher-contrast images can be displayed in the reflective display mode. Furthermore, light entering from the outside is scattered at the transmissive scattering layer, and subsequently, reaches the reflection layer through the upper electrode, the liquid crystal layer, and the lower electrode. After being reflected at the reflection layer, the light is emitted to the outside through the inverse course as it diffuses. Thus, the viewing angle in the reflective display mode can be further increased.

The transmissive display region may include a lower electrode, the liquid crystal layer, and an upper electrode in that order from the lower substrate (backlight side substrate or internal substrate) side. In this instance, since the transmissive display region does not include the transmissive scattering layer acting as the liquid crystal layer thickness-reducing means, the thickness of the liquid crystal layer in the transmissive display region is larger than that in the reflective display region with the transmissive scattering layer. Consequently, a thickness of the liquid crystal layer equivalent to the distance where light goes and returns through the liquid crystal layer in the reflective display mode can be ensured in the transmissive display region. Thus, retardation in the transmissive display region substantially equivalent to the retardation in the reflective display region can be ensured. Preferably, the distances between the upper substrate and the lower substrate in the reflective display region and the transmissive display region are set substantially the same, and more preferably the same. Then, by forming the transmissive scattering layer, the difference in the thickness of liquid crystal layer between the reflective display region and the transmissive display region can be ensured.

The reflective display region may include a color filter between the reflection layer and the liquid crystal layer, and the transmissive display region may include a color filter between the lower substrate and the liquid crystal layer. Thus, color images can be displayed in the reflective display mode and the transmissive display mode. Alternatively, the reflective display region may include a color filter between the upper substrate and the liquid crystal layer, and the transmissive display region may include a color filter between the upper substrate and the liquid crystal layer.

The color filters in the reflective display region and the transmissive display region may have different spectral characteristics, and the color purity of the color filter in the transmissive display region may be higher than the color purity of the color filter in the reflective display region. In this instance, in the transmissive display mode, transmitted light is used for displaying images after passing through the color filter once. On the other hand, in the reflective display mode, light entering from the outside passes through the color filter twice, that is, when it enters and after it reflects. Therefore, by setting the color purity of the color filter in the transmissive display region higher than that in the reflective display regions, the contrast of transmissive display images can be substantially equal to that of reflective display images.

The transmissive scattering layer may comprise a polymer matrix and a filler dispersed in the polymer matrix. The filler has a refractive index different from the refractive index of the polymer matrix. If light emitted from the outside is scattered by asperities formed on the surface of a reflection layer and is thus reflected, as in the known device described above, reflective display light is liable to have variations of light and shade, and the scattered light may cause glare. However, by using the transmissive scattering layer having the above-described structure, uniform scattered light can be used for displaying images in a reflective display mode. The polymer matrix may be formed of acrylic resin. The filler may be formed of a material having a refractive index different from that of the polymer used as the matrix and capable of phase separation from the matrix polymer, and, for example, it may be formed of glass beads (silicon oxide particles), titanium oxide particles, or powdered resin particles. The thickness of the transmissive scattering layer is, for example, in a range of about 1 to 5 $\mu$m, and the particle size of the filler is, for example, in a range of about 0.5 to 2 $\mu$m.

Also, the surface at the liquid crystal layer side (upper substrate side) of the lower substrate may have asperities. In this instance, the reflection layer is formed on the surface of the lower substrate having the asperities, and consequently, external light is reflected with scattering by the asperities on the lower substrate and further scattered by the transmissive scattering layer. Therefore, brighter, higher-contrast images can be displayed in the reflective display mode.

The present invention is also directed to an electronic apparatus comprising a liquid crystal display device having the above-described structure. Thus, the resulting electronic apparatus is capable of switching between a transmissive display mode and a reflective display mode, and can display bright, high-contrast images in both display modes.

DETAILED DESCRIPTION OF THE PREFERRED EMBODIMENTS

Embodiments of the present invention will now be illustrated with reference to drawings.

First Embodiment

Figure 1:
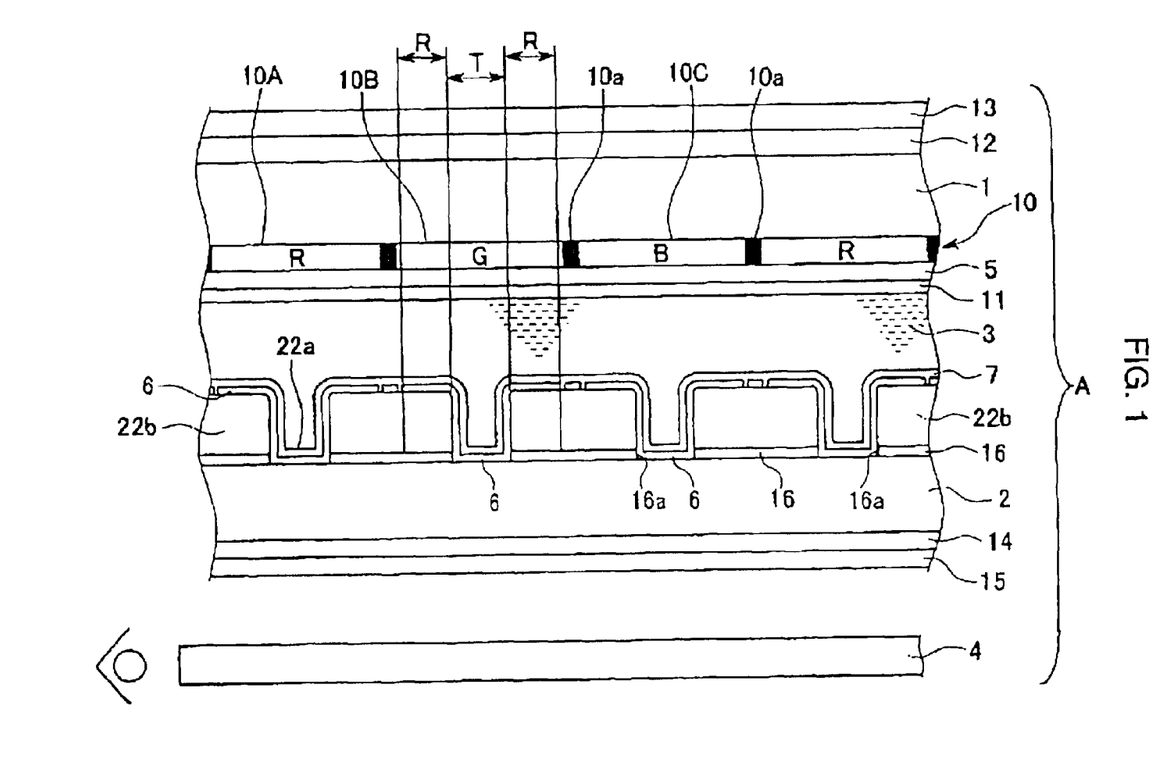
FIG. 1 is a schematic fragmentary sectional view of a liquid crystal display device according to a first embodiment of the present invention.

FIG. 1 shows an active matrix liquid crystal display device to which a liquid crystal display device according to a first embodiment of the present invention has been applied. This liquid crystal display device A of the first embodiment has a fundamental structure in which a liquid crystal layer 3 is held between substrates 1 and 2 each formed of transparent glass or the like and opposing each other, as shown in the sectional view in FIG. 1. A sealant is interposed between and along the sides of the substrates 1 and 2 to surround the liquid crystal layer 3, but not shown in the drawing, and thus, the liquid crystal layer 3 is sealed and held between the substrates 1 and 2. A backlight 4 having a light source and a light guide plate underlies the lower substrate 2.

A retardation layer 12 and a polarizer 13 overlie the upper substrate 1 (at the viewer side), and another retardation layer 14 and polarizer 15 underlie the lower substrate 2. The polarizers 13 and 15 only transmit light linearly polarized in one direction out of the external light emitted from above (at the viewer side) and the backlight 4 emitted from below, and the retardation layers 12 and 14 convert the linearly polarized light transmitted through the polarizers 13 and 15 to circularly polarized light (including elliptically polarized light). Thus, the polarizers 13 and 15 and the retardation layers 12 and 14 serve as circularly polarized light-emitting means. In the present embodiment, one side having the backlight 4 is referred to as the lower side, and the other side from which external light enters is referred to as the upper side. The substrates 1 and 2 may be referred to as the upper substrate 1 and the lower substrate 2, respectively.

The upper substrate 1 has a transparent electrode 5 formed of ITO (Indium Tin Oxide) or the like at the liquid crystal layer 3 side with a color filter 10 therebetween, and the transparent electrode 5 has an alignment layer 11 at the liquid crystal layer 3 side so as to be covered therewith. Also, a reflection layer 16 having a plurality of separated rectangular potions in plan view is formed at the liquid crystal layer 3 side of the lower substrate 2, in the horizontal direction of FIG. 1 and the direction perpendicular to the drawing, with apertures 16a at predetermined intervals. The reflection layer 16 is formed of a light-reflecting metal, such as Al, in a rectangular shape in plan view, and the alignment layer 11 is formed of a polymer, such as polyimide, and is subjected to specific rubbing.

On the upper surface of the reflection layer 16, a transmissive scattering layer 22b including a plurality of spaced apart members in the form of protrusions is formed. The transmissive scattering layer 22b covers the upper surface of the reflection layer 16 and includes apertures or recesses 22a between the protrusions. Transparent electrodes 6 are disposed on the surface (at the liquid crystal layer 3 side) of the protrusions of the transmissive scattering layer 22b and at the bottom of the recesses 22a (on the surface of the lower substrate 2 where the recesses 22a are formed), and are covered with an alignment layer 7. The transparent electrodes 6 are formed of, for example, ITO (Indium Tin Oxide), and the alignment layer 7 is formed of, for example, a polymer, such as polyimide, subjected to specific rubbing.

In the present embodiment, the regions of the liquid crystal layer 3 used for displaying images include reflective display regions R and transmissive display regions T, and the thickness of the liquid crystal layer 3 varies between the reflective and transmissive display regions. Specifically, the protrusions of the transmissive scattering layer 22b are formed in the reflective display regions R, and the recesses 22a are formed in the transmissive display regions T. The formation of the transmissive scattering layer 22b makes the thickness of the liquid crystal layer 3 in the reflective display regions R smaller (thinner) than the thickness of the liquid crystal layer 3 in the transmissive display regions T. Hence, the thickness of the liquid crystal layer 3 in the reflective display regions R is reduced due to the presence (i.e., thickness) of the transmissive scattering layer 22b, and thus, the transmissive scattering layer 22b serves as a thickness-reducing means for reducing the thickness of the liquid crystal layer in the reflective display regions.

Figure 3:
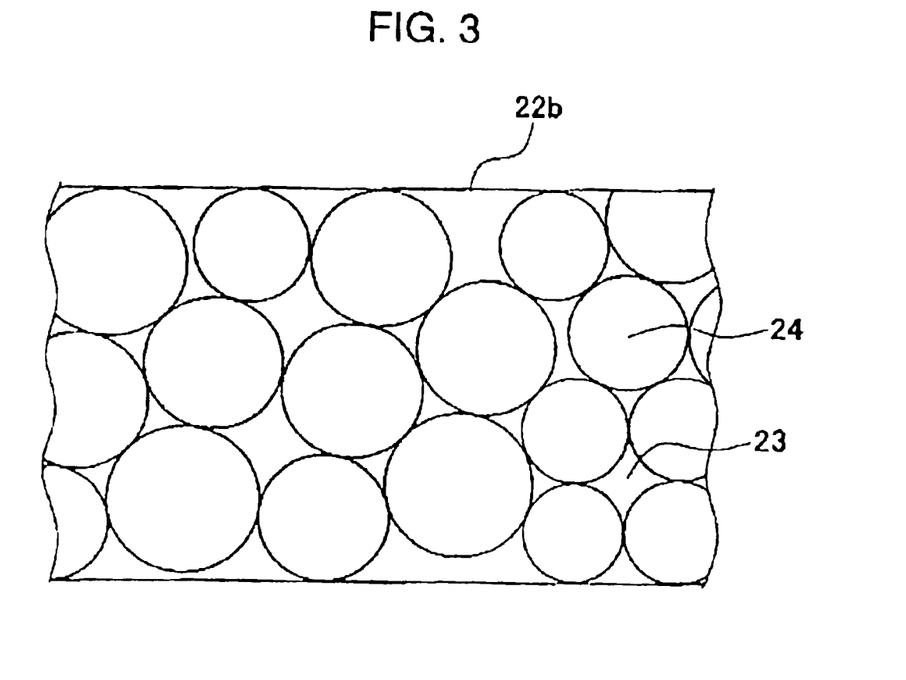
FIG. 3 is a schematic illustration of a transmissive scattering layer of the liquid crystal display device shown in FIG. 1.

The transmissive scattering layer 22b contains a polymer (resin) acting as a matrix 23 and a filler 24 dispersed in the matrix 23 and having a refractive index different from that of the matrix 23, as shown in FIG. 3. Specifically, the thickness of the transmissive scattering layer 22b is in a range of about 1 to 5 $\mu$m, and the particle size of the filler 24 is in a range of about 0.5 to 2 $\mu$m. The polymer is, for example, an acrylic resin, and the filler is formed of, for example, glass (silicon oxide particles). Alternatively, other fillers, such as titanium oxide particles, or a polymer having a refractive index different from that of the polymer used as the matrix and capable of phase separation from the matrix polymer may be used as the filler. Such a constitution of the filler 24 dispersed in the matrix 23 helps the transmissive scattering layer 22b serve as an incident light-scattering means for scattering incident light.

Figure 2:
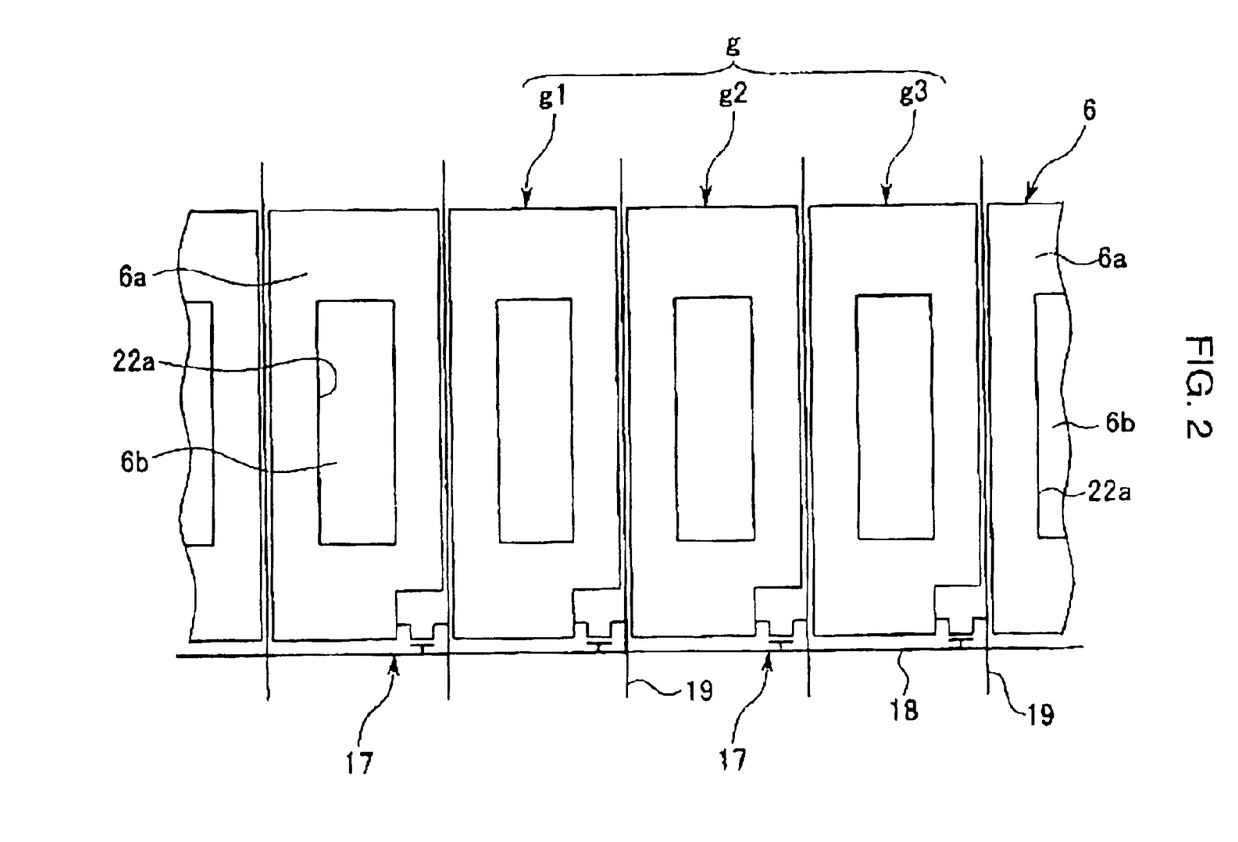
FIG. 2 is an fragmentary enlarged plan view of a reflection layer of the liquid crystal display device shown in FIG. 1.

FIG. 2 is a schematic plan view of the electrodes 6 of the liquid crystal display device A shown in FIG. 1. As shown in FIG. 2, the display region of the liquid crystal display device A includes many pixels g, each having a substantially square shape and defined by three vertically oriented electrodes 6 when viewed from above. Specifically, since the liquid crystal display device A of the present embodiment is intended to display color images, the substantially square pixels g defined by the three electrodes 6, shown in FIG. 2, are each divided into three dots g1, g2, and g3. The rectangular recesses 22a are formed in the middle of the electrodes 6 corresponding to the dots g1 to g3, and the electrodes 6 are also disposed at the bottoms of the recesses 22a.

The electrodes 6 are divided, by functions, into transmissive display electrodes 6b disposed in the regions corresponding to the recesses 22a, that is, from the bottom to the side walls of the recesses 22a, and reflective display electrodes 6a disposed in the regions corresponding to the protrusions of the transmissive scattering layer 22b (see FIG. 1), that is, on the upper surface of the transmissive scattering layer 22b. Thus, the transmissive display electrodes 6b and the reflective display electrodes 6a contribute to displaying images in a transmissive display mode and in a reflective display mode, respectively. The transmissive display electrodes 6b are positioned in the apertures 16a shown in FIG. 1, and the reflective display electrodes 6a are positioned above the reflection layer 16, which has the apertures 16a, with the transmissive scattering layer 22b therebetween.

The length and width of the apertures 16a formed in the reflection layer 16 are tens of percent of those of dots g1, g2, and g3. A thin-film transistor 17 acting as a switching element for driving the corresponding electrode 6 is disposed at a corner of each dot, and is connected to a gate wire 18 and a source wire 19 which apply power to the thin-film transistor 17. In the present embodiment, the thin-film transistors 17 are used as switching elements. Alternatively, two-terminal linear elements or another type of switching element may be used as the switching elements, according to need.

In addition, pigmented portions of the color filter 10 (see FIG. 1) are disposed corresponding to the respective plan positions of the dots g1, g2, and g3. The color filter 10 includes pigmented portions 10A, 10B, 10C colored R (red), G (green), and B (blue), respectively, and light-shielding films (black matrix) 10a disposed between these pigmented portions. In the color filter 10 shown in FIG. 1, the pigmented portions 10A (red), 10B (green), 10C (blue) are repeatedly arrayed in that order. However, they may be arrayed in a random or mosaic manner or in other orders.

The operation and effect of the transflective liquid crystal display device A shown in FIGS. 1 and 2 will now be described. When the liquid crystal display device A displays images in a reflective mode, light emitted from outside the device is used. The light enters the liquid crystal layer 3 through the color filter 10, the electrode 5, and the alignment layer 11.

In this instance, after passing through the liquid crystal layer 3, in the reflective display regions R, the light passes through the alignment layer 7, the electrodes 6, and the transmissive scattering layer 22b and, subsequently, reflects at the reflection layer 16. Then, the reflecting light passes, again, through the transmissive scattering layer 22b, the electrodes 6, the alignment layer 7, and the liquid crystal layer 3, and further through the alignment layer 11, the electrode 5, the color filter 10, the substrate 1, the retardation layer 12, and polarizer 13, thus returning to the outside of the device to reach a viewer. Thus, the liquid crystal display device A displays reflective color images. On the other hand, in the transmissive display regions T, after passing through the liquid crystal layer 3, the light emitted (i.e., entering the device) from above passes through the alignment layer 7, the electrodes 6, and the apertures 16a of the reflection layer 16. After passing through the apertures 16a, the light passes through the lower substrate 2 and the retardation layer 14 and is, thereafter, absorbed by the polarizer 15. In such a reflective color display mode, the electrodes 5 and 6 orient the liquid crystal molecules in the liquid crystal layer 3 to change the transmittance of light passing through the liquid crystal layer 3, and thus, contrasted images can be displayed.

On the other hand, when the liquid crystal display device A displays images in a transmissive display mode, light emitted from the backlight 4 is used, and the light passes through the polarizer 15, the retardation layer 14, and the substrate 2. In this instance, in the transmissive display regions T, the light from the substrate 2 passes through the electrodes 6, the alignment layer 7, the liquid crystal layer 3, the alignment layer 11, the electrode 5, the color filter 10, the substrate 1, the retardation layer 12, and the polarizer 13, in that order, and thus the liquid crystal display device A displays color images in a transmissive display mode. In the reflective display regions R, the light from the substrate 2 is reflected at the reflection layer 16. The reflected light passes through the retardation layer 14, and is absorbed by the polarizer 15. In such a transmissive color display mode, the electrodes 5 and 6 orient the liquid crystal molecules in the liquid crystal layer 3 to change the transmittance of light passing through the liquid crystal layer 3, and thus, contrasted images can be displayed as well.

In these display modes, the reflective display mode allows incident light to pass through the liquid crystal layer 3 twice, but the transmissive display mode allows light emitted from the backlight 4 to pass through the liquid crystal layer 3 only once. The retardation in the liquid crystal layer 3 differs between the reflective display mode and the transmissive display mode. Therefore, when an identical voltage is applied to the electrodes 5 and 6 to orient the liquid crystal molecules, the transmittance in the liquid crystal is varied between the reflective display mode and the transmissive display mode. In the present embodiment, however, by providing the reflective display regions R, which have the reflection layer 16 shown in FIG. 1, with the transmissive scattering layer 22b, the thickness of the liquid crystal layer 3 in the transmissive display regions T, which correspond to the apertures 16a shown in FIG. 1, is set larger than that in the reflective display regions R. Thus, the transmittance or the reflectance in the liquid crystal layer 3 in both reflective display regions R and the transmissive display regions T can be set uniform at an identical voltage. Hence, the transmissive scattering layer 22b allows the retardation in the reflective display regions R and the transmissive display regions T to be uniform, and thus bright and high-contrast images can be displayed in both reflective and transmissive display modes.

Also, since the transmissive scattering layer 22b contains the filler 24 dispersed in the matrix 23 and having a refractive index different from that of the matrix 23, as shown in FIG. 3, the scattering layer 22b can scatter incident light, and thus, bright images can be readily displayed in the reflective display mode. Therefore, the liquid crystal display device A of the present embodiment is a transflective liquid crystal display device in which the transmissive scattering layer 22b disposed in the reflective display regions R scatters light and reduces the thickness of the liquid crystal layer. Thus, bright and high-contrast images can be displayed in both reflective and transmissive display modes.

Second Embodiment

Figure 4:
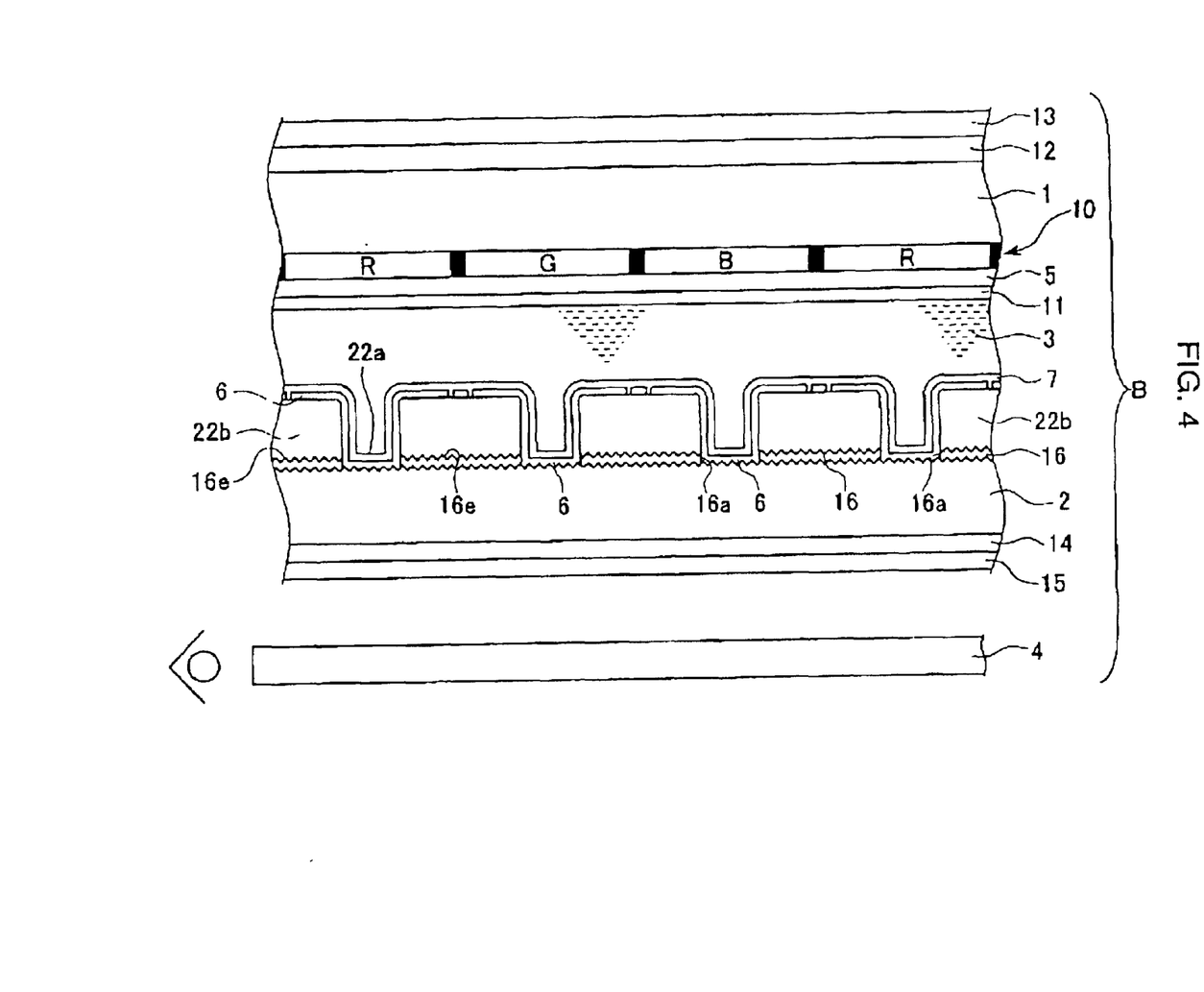
FIG. 4 is a schematic fragmentary sectional view of a liquid crystal display device according to a second embodiment of the present invention.

A second embodiment will now be described with reference to FIG. 4. In FIG. 4, the same reference numerals as in FIG. 1 designate the same parts unless otherwise specified, and the description is not repeated. A liquid crystal display device B according to the second embodiment has a lower substrate (backlight side substrate) 2 having asperities on the upper surface thereof to form a rough surface. The surface roughness of the upper rough surface is in a range of 0.5 to 0.8 μm, and the asperities are formed in a random manner. On the rough surface, a reflection layer 16 having a diffuse reflection surface 16e is disposed, and the diffuse reflection surface 16e has irregular asperities.

The asperities of the substrate 2 are formed by, for example, photolithography in which a resist is applied onto a glass substrate used as the substrate 2 and is subsequently subjected to etching with hydrogen fluoride, followed by removal of the resist. The liquid crystal display device B also displays images in a reflective display mode and a transmissive display mode, as in the liquid crystal display device A of the first embodiment. The thickness of the liquid crystal layer of this liquid crystal display device also is varied between the transmissive display regions T and the reflective display regions R, as in the first embodiment, thus leading to the same effect. Furthermore, since the reflection layer 16 of the second embodiment is provided with the diffuse reflection surface 16e having the irregular asperities, incident light is not only scattered by the transmissive scattering layer 22b, but also reflected in various directions at the diffuse reflection surface 16e, thus further increasing the viewing angle in the reflective display mode.

Third Embodiment

Figure 5:
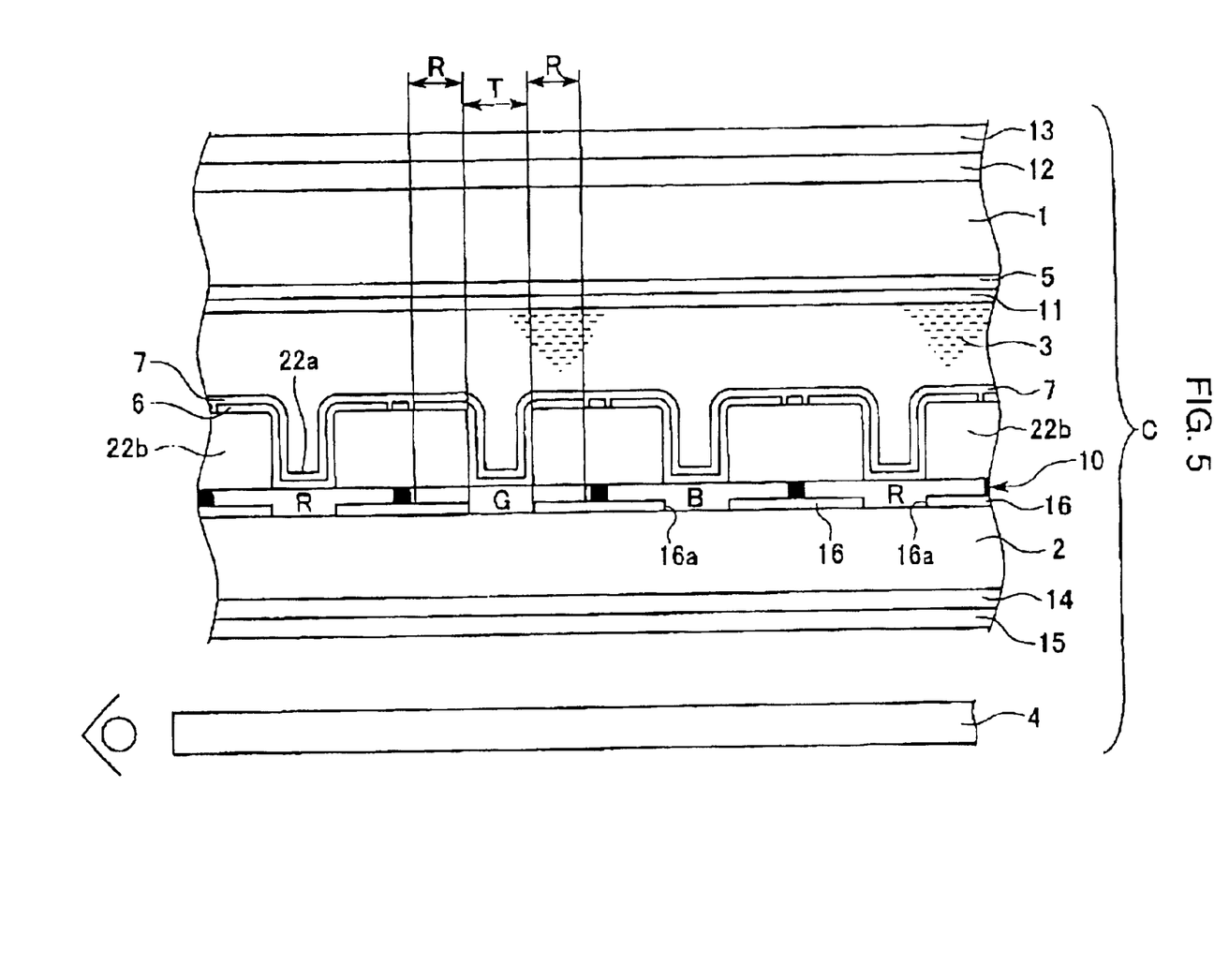
FIG. 5 is a schematic fragmentary sectional view of a liquid crystal display device according to a third embodiment of the present invention.

A third embodiment will now be described with reference to FIG. 5. In FIG. 5, the same reference numerals as in FIG. 1 designate the same parts unless otherwise specified, and the description is not repeated. In a liquid crystal display device C according to the third embodiment, not only is a reflection layer 16 formed on the surface (at a liquid crystal layer 3 side) of a lower substrate 2, but also a color filter 10 is provided on the upper surface of the reflection layer 16 so as to fill apertures 16a of the reflection layer 16. Above the color filter 10, a transmissive scattering layer 22b, electrodes 6, an alignment layer 7, and a liquid crystal layer 3 are disposed in reflective display regions R, and the electrodes 6, the alignment layer 7, and the liquid crystal layer 3 are disposed in transmissive display regions T.

The liquid crystal display device C also displays images in a reflective display mode and a transmissive display mode, as in the liquid crystal display device A of the first embodiment. The thickness of the liquid crystal layer of this liquid crystal display device is also varied between the transmissive display regions T and the reflective display regions R by forming the transmissive scattering layer 22b in the reflective display regions R, as in the first embodiment, thus leading to the same effect.

Fourth Embodiment

Figure 6:
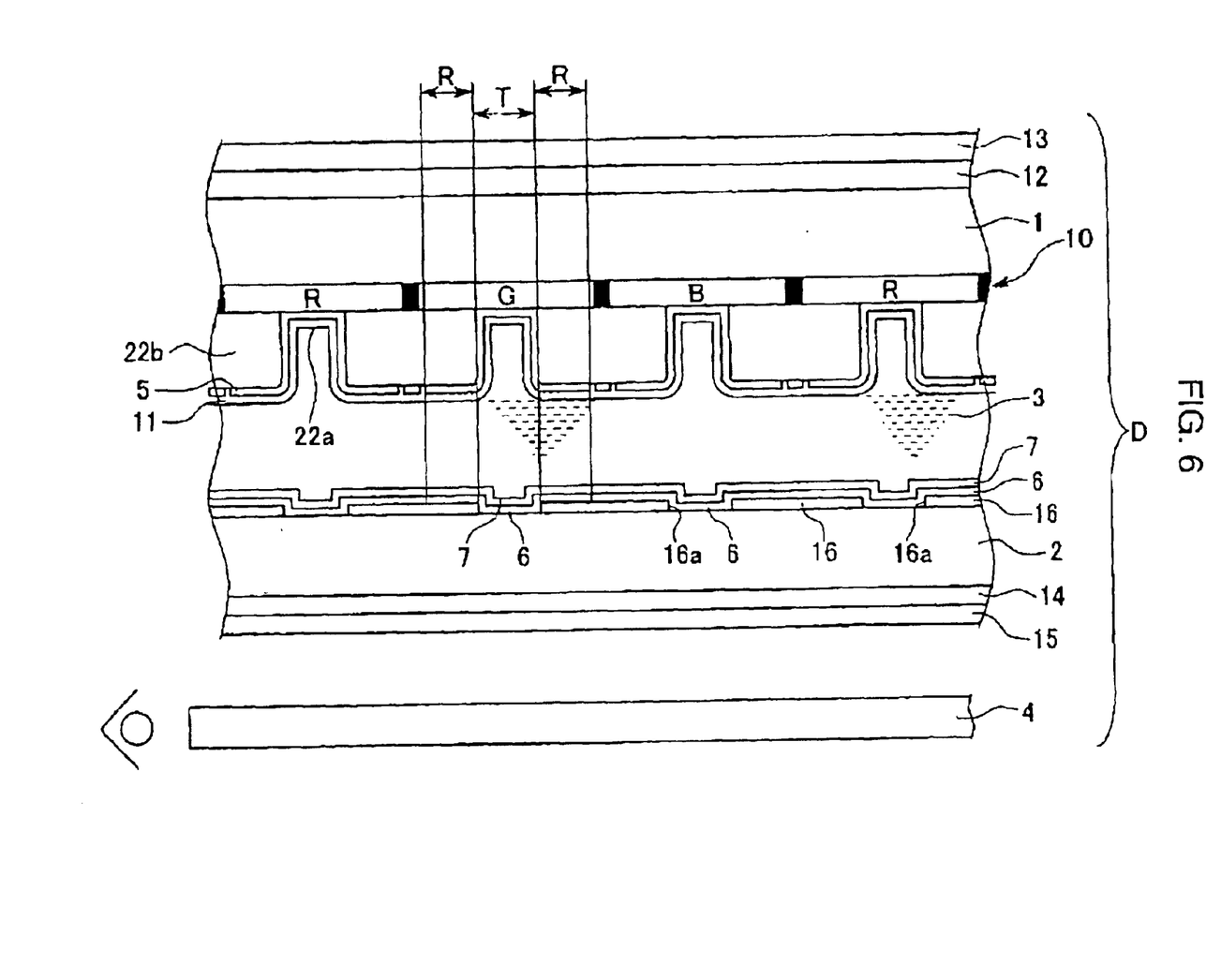
FIG. 6 is a schematic fragmentary sectional view of a liquid crystal display device according to a fourth embodiment of the present invention.

A fourth embodiment will now be described with reference to FIG. 6. In FIG. 6, the same reference numerals as in FIG. 1 designate the same parts unless otherwise specified, and the description is not repeated. In a liquid crystal display device D according to the fourth embodiment, a color filter 10 including R (red), G (green), and B (blue) is disposed on the internal side surface of the upper substrate 1, and a transmissive scattering layer 22b is disposed at the liquid crystal layer 3 side of the color filter 10. Specifically, the transmissive scattering layer 22b, electrodes 5, and an alignment layer 11 are formed between the color filter 10 on the surface (at the liquid crystal layer 3 side) of the upper substrate 1 and the liquid crystal layer 3.

The liquid crystal display device D is also provided with the transmissive scattering layer 22b in the reflective display regions R to make the thickness of the liquid crystal layer 3 in the transmissive display regions T larger than that in the reflective display regions R, as in the first embodiment, thus leading to the same effect as in the first embodiment. Furthermore, in the fourth embodiment, light emitted (i.e., entering the device) from the outside is scattered at the transmissive scattering layer 22b, and subsequently, passes through the electrodes 5, the alignment layer 11, the liquid crystal 3, the alignment layer 7, and the electrode 6 to reach the reflection layer 16. After being reflected at the reflection layer 16, the light is emitted to the outside through the inverse course as it diffuses. Thus, the viewing angle in the reflective display mode can be further increased.

Fifth Embodiment

Figure 7:
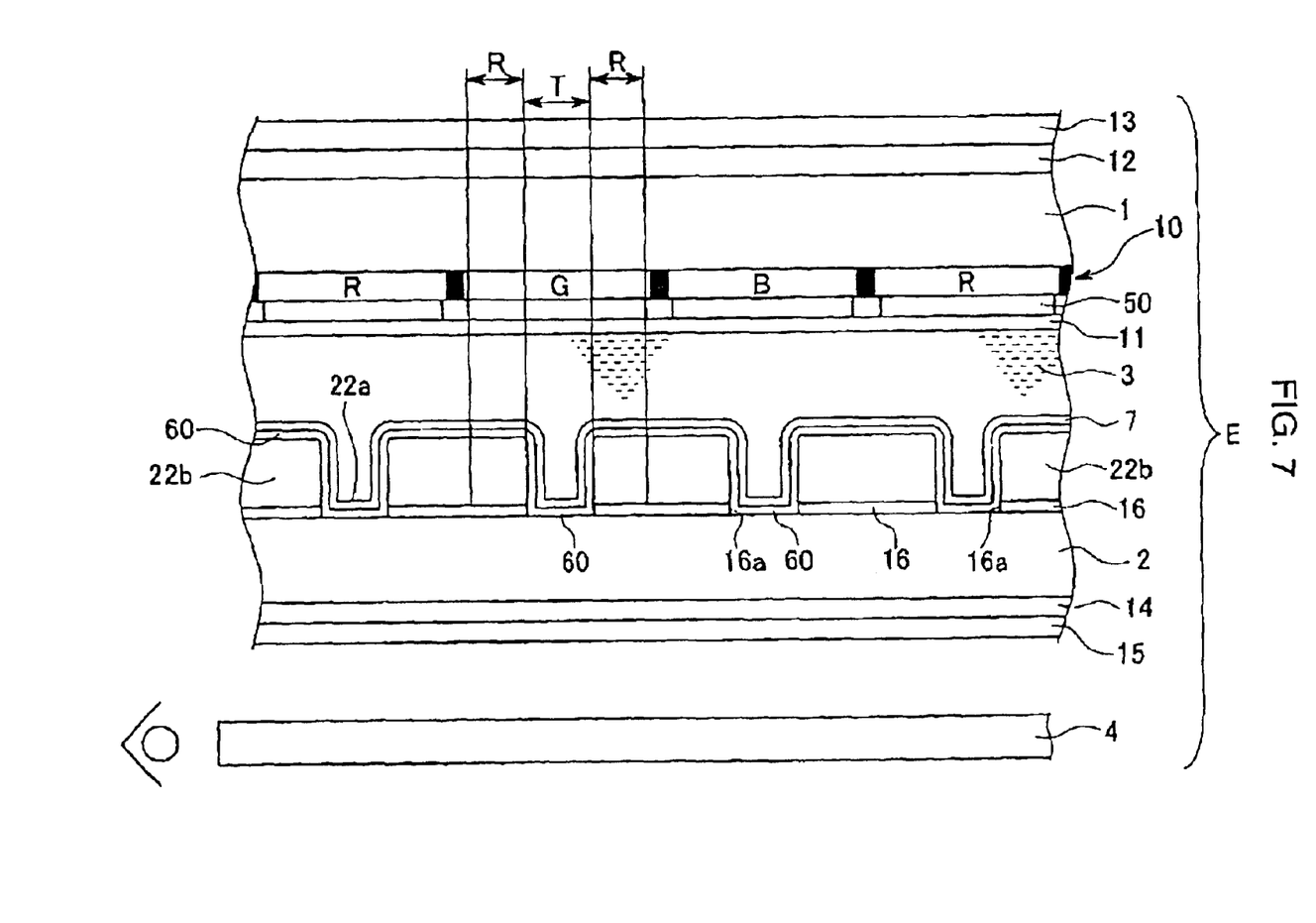
FIG. 7 is a schematic fragmentary sectional view of a liquid crystal display device according to a fifth embodiment of the present invention.
Figure 8:
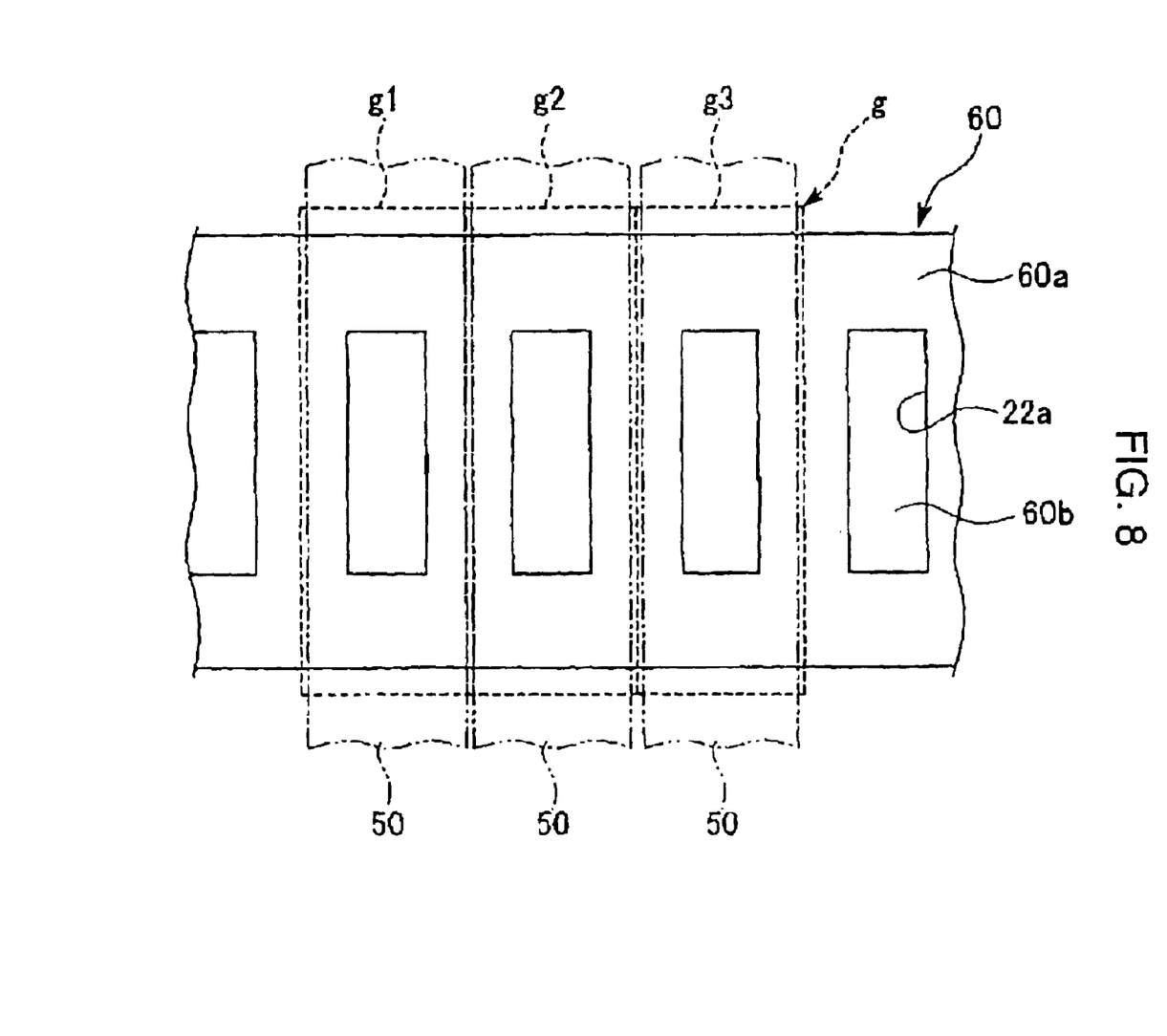
FIG. 8 is a fragmentary enlarged plan view of a reflection layer of the liquid crystal display device shown in FIG. 7.

A fifth embodiment will now be described with reference to FIGS. 7 and 8. In the drawings, the same reference numerals as in FIG. 1 designate the same parts unless otherwise specified, and the description is not repeated. FIGS. 7 and 8 show a matrix-type liquid crystal display device to which a transflective liquid crystal display device according to a fifth embodiment of the present invention has been applied. The liquid crystal display device E according to the fifth embodiment has a fundamental structure as shown in the cross-sectional view in FIG. 7, in which substrates 1 and 2 formed of transparent glass or the like and opposing each other hold a liquid crystal layer 3 therebetween, and this is the same as in the other embodiments described above. A backlight 4 is also provided under the lower substrate 2, in FIG. 7.

In the liquid crystal display device E shown in FIG. 7, rectangular upper transparent electrodes 50 in plan view are separately disposed, at the liquid crystal layer 3 side of the substrate 1, in a row in the horizontal direction in FIG. 7 so as to correspond to a display region, and the electrodes 50 each extend in the direction perpendicular to FIG. 7. On the other hand, a plurality of rectangular lower electrodes 60 in plan view are separately disposed in the direction perpendicular to FIG. 7 at the liquid crystal layer 3 side of the substrate 2 so as to correspond to the display region and the lower electrodes 60 each extend in the horizontal direction in FIG. 7. The upper electrodes 50 and the lower electrodes 60 intersect each other at 90° when viewed from above.

In the liquid crystal display device E, the display region includes a plurality of pixels g which are defined by the intersections of the electrodes 50 and 60 in plan view, as shown in FIG. 8. Since the liquid crystal display device E is intended to display color images, each pixel g, which is designated by the short-dashed line in FIG. 8, is defined by the intersections of tree upper electrodes 50 and one lower electrode 60, and is thus divided into three dots g1, g2, and g3 which are each defined by one upper electrode 50 and one lower electrode 60. The electrode 60 is provided with rectangular recesses 22a in the centers of the regions corresponding to the dots g1 to g3. As in the first embodiment, the recesses 22a define transmissive display electrodes 60b, and thus the regions having the transmissive display electrodes 60b serve as transmissive display regions T, and the protrusion surrounding the recesses 22a and corresponding to the protrusions of the transmissive scattering layer 22b defines a reflective display electrode 60a, and thus the region having the reflective display electrode 60a serves as a reflective display region R. If the liquid crystal display device is not intended to display color images, but to display monochrome images, the rectangular electrodes 50 and 60 have the same width and the color filter 10 is eliminated.

The liquid crystal display device E also displays images in a reflective display mode and a transmissive display mode, as in the liquid crystal display device A of the first embodiment. The thickness of the liquid crystal layer of this liquid crystal display device is also varied between the transmissive display regions T and the reflective display regions R because of the transmissive scattering layer 22b in the reflective display regions R, as in the first embodiment, thus leading to the same effect.

Modification Common to the Embodiments

Figure 9:
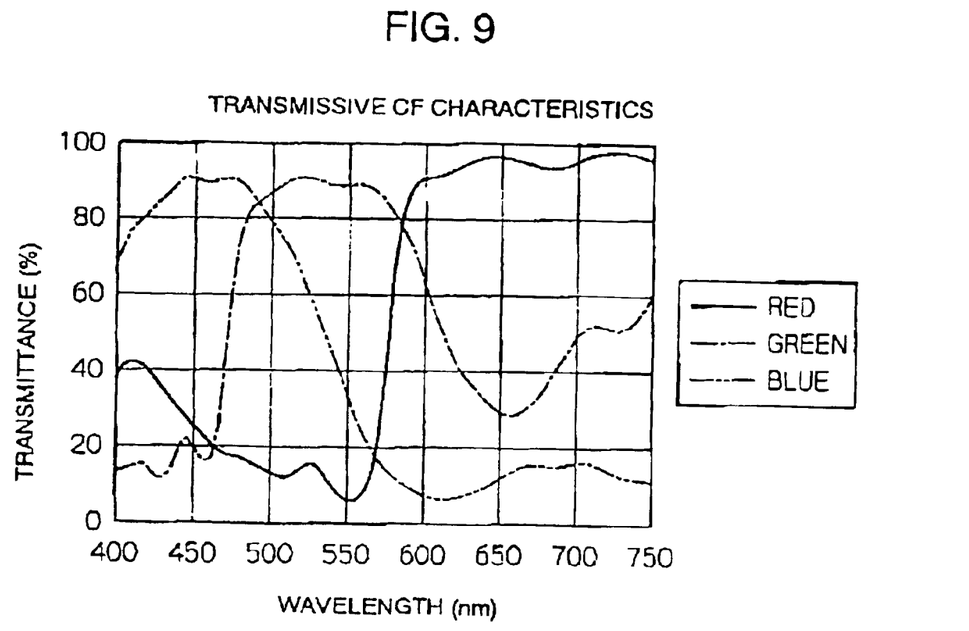
FIG. 9 is a graph showing the spectral characteristics of a color filter used in a transmissive display mode.
Figure 10:
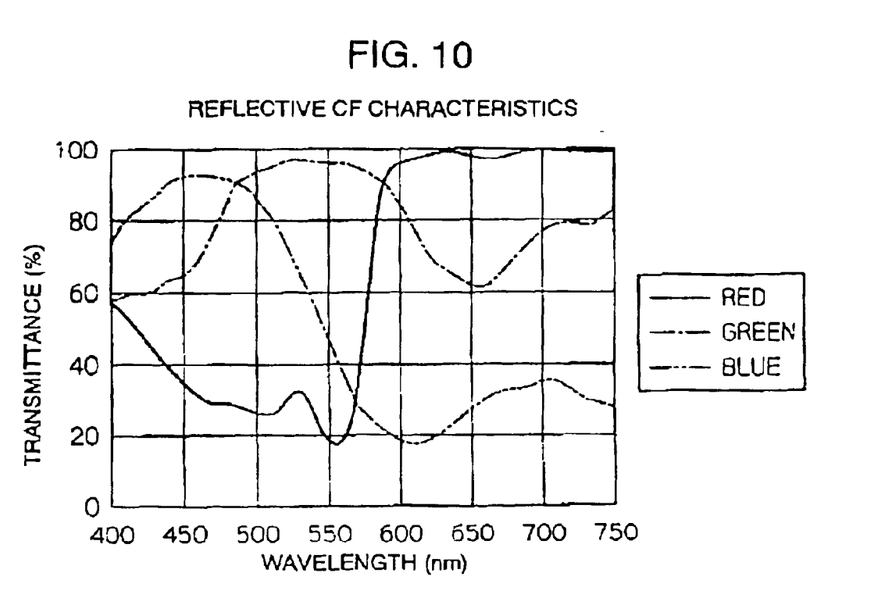
FIG. 10 is a graph showing the spectral characteristics of a color filter used in a reflective display mode.

In the liquid crystal display devices A to E of the first to fifth embodiments, the color filter 10 may be formed such that the spectral characteristics thereof differ between the reflective display regions R and the transmissive display regions T. Specifically, as shown in FIGS. 9 and 10, the color purity of the color filter 10 in the transmissive display regions T (transmissive CF characteristics shown in FIG. 9) may be set relatively higher than that in the reflective display regions R (reflective CF characteristics shown in FIG. 10). In this instance, in a transmissive display mode, transmitted light is used for displaying images after passing through the color filter 10 once. On the other hand, in a reflective display mode, light emitted from the outside passes through the color filter 10 twice, that is, when it enters and reflects. Therefore, by setting the color purity of the color filter 10 in the transmissive display regions T higher than that in the reflective display regions R, as shown in FIGS. 9 and 10, the contrast of images displayed in the transmissive display mode can substantially be equal to that of images displayed in the reflective display mode.

Electronic Apparatus

Electronic apparatuses having a liquid crystal display device according the embodiments will now be described.

FIG. 11(a) is a perspective view of an exemplary cellular telephone. In FIG. 11(a), numeral 500 designates the main body of a cellular phone and numeral 501 designates a liquid crystal display using one of the liquid crystal display devices A to E.

FIG. 11(b) is a perspective view of an exemplary portable information processing apparatus, such as a word processor or a personal computer. In FIG. 11(b), numeral 600 designates an information processing apparatus, numeral 601 designates an input portion, such as a keyboard, numeral 603 designates the main body of the information processing apparatus, and numeral 602 designates a liquid crystal display using one of the liquid crystal display devices A to E.

FIG. 11(c) is a perspective view of an exemplary wristwatch-type electronic apparatus. In FIG. 11(c), numeral 700 designates the main body of a wristwatch and numeral 701 designates a liquid crystal display using one of the liquid crystal display devices A to E.

Figure 11:
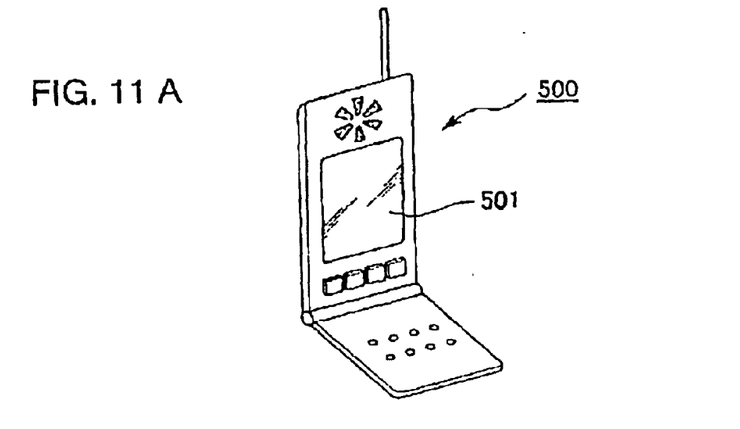
FIGS. 11A–11B are perspective views showing exemplary electronic apparatuses of the present invention.

Since these electronic apparatuses shown in FIG. 11 include any one of the liquid crystal display devices A to E, they can display bright and high-contrast images in various environments.

Advantages

As described above, according to the present invention, by providing the transmissive scattering layer in the reflective display regions R, the retardation in the reflective display regions and the transmissive display regions can be uniform, and bright and high-contrast images can be displayed in both transmissive and reflective display modes. In addition, the reflective scattering layer scatters light effectively in the reflective display mode, and thus, bright images can be readily displayed in the reflective display mode.

The entire disclosure of Japanese Patent Application No. 2001-371806 filed Dec. 5, 2001 is incorporated by reference herein.

What is claimed is:

1. A liquid crystal display device comprising:

a pair of substrates; and a liquid crystal layer held between the pair of substrates, the liquid crystal layer including at least two regions having different thicknesses from each other;

wherein one of the two regions includes a reflective display region and the other of the two regions includes a transmissive display region, the reflective display region being provided with a reflection layer capable of reflecting light and a transmissive scattering layer capable of scattering light;

wherein the thickness of the liquid crystal layer in the reflective display region is smaller than the thickness of the liquid crystal layer in the transmissive display region; and wherein one of the pair of substrates is an upper substrate, and the other of the pair of substrates is a lower substrate, and wherein the reflective display region includes the reflection layer, the transmissive scattering layer, a lower electrode, the liquid crystal layer, and an upper electrode in that order from the lower substrate side.

2. A liquid crystal display device according to claim 1, wherein the transmissive scattering layer is disposed in the reflective display region between the pair of substrates and serves as a liquid crystal layer thickness-reducing means for reducing the thickness of the liquid crystal layer in the reflective display region to less than the thickness of the liquid crystal layer in the transmissive display region.

3. A liquid crystal display device according to claim 1, wherein one of the pair of substrates is an upper substrate, and the other of the pair of substrates is a lower substrate, and wherein the transmissive display region includes a lower electrode, the liquid crystal layer, and an upper electrode in that order from the lower substrate side.

4. A liquid crystal display device according to claim 1, wherein the reflective display region includes a color filter between the upper substrate and the liquid crystal layer, and the transmissive display region includes a color filter between the upper substrate and the liquid crystal layer.

5. A liquid crystal display device according to claim 4, wherein the color filters in the reflective display region and the transmissive display region have different spectral characteristics, and the color purity of the color filter in the transmissive display region is higher than the color purity of the color filter in the reflective display region.

6. A liquid crystal display device according to claim 3, wherein the reflective display region includes a color filter between the upper substrate and the liquid crystal layer, and the transmissive display region includes a color filter between the upper substrate and the liquid crystal layer.

7. A liquid crystal display device according to claim 6, wherein the color filters in the reflective display region and the transmissive display region have different spectral characteristics, and the color purity of the color filter in the transmissive display region is higher than the color purity of the color filter in the reflective display region.

8. A liquid crystal display device according to claim 1, wherein the transmissive scattering layer comprises a polymer matrix and a filler dispersed in the polymer matrix, the filler having a refractive index different from the refractive index of the polymer matrix.

* * * * *